United States Patent [19]

Urban et al.

[11] Patent Number: 5,667,029
[45] Date of Patent: Sep. 16, 1997

[54] DRIVE SYSTEM FOR HYBRID ELECTRIC VEHICLE

[75] Inventors: Edward F. Urban, Glen Head; George E. Mavroudis, Dix Hills, both of N.Y.

[73] Assignee: New York Institute of Technology, Old Westbury, N.Y.

[21] Appl. No.: 455,128

[22] Filed: May 31, 1995

[51] Int. Cl.$^6$ ...................................... B60K 6/02
[52] U.S. Cl. .................. 180/65.2; 180/65.4; 180/65.6
[58] Field of Search .................. 180/65.1, 65.2, 180/65.3, 65.4, 65.6, 65.7

[56] References Cited

U.S. PATENT DOCUMENTS

| | | | |
|---|---|---|---|
| 1,083,730 | 1/1914 | Collischonn | 180/65.2 |
| 1,402,250 | 1/1922 | Pieper | 180/65.2 X |
| 1,992,210 | 2/1935 | Higky | 180/65.2 X |
| 2,506,809 | 5/1950 | Nims . | |
| 2,571,284 | 10/1951 | Nims . | |
| 2,666,492 | 1/1954 | Nims et al. . | |
| 3,205,965 | 9/1965 | Roth . | |
| 3,211,249 | 10/1965 | Papst | 180/65.2 |
| 3,367,438 | 2/1968 | Moore | 180/65.2 |
| 3,503,464 | 3/1970 | Yardney . | |
| 3,732,751 | 5/1973 | Berman et al. . | |
| 3,791,473 | 2/1974 | Rosen . | |
| 3,888,325 | 6/1975 | Reinbeck . | |
| 3,923,115 | 12/1975 | Helling . | |
| 4,042,056 | 8/1977 | Horwinski et al. . | |
| 4,165,795 | 8/1979 | Lynch et al. . | |
| 4,242,922 | 1/1981 | Baudoin . | |
| 4,313,080 | 1/1982 | Park . | |
| 4,335,429 | 6/1982 | Kawakatsu | 180/65.2 X |
| 4,351,405 | 9/1982 | Fields et al. . | |
| 4,423,794 | 1/1984 | Beck . | |
| 4,438,342 | 3/1984 | Kenyon . | |
| 5,002,020 | 3/1991 | Kos . | |
| 5,125,469 | 6/1992 | Scott . | |
| 5,172,784 | 12/1992 | Varela, Jr. . | |
| 5,176,213 | 1/1993 | Kawai et al. . | |
| 5,249,637 | 10/1993 | Heidl et al. . | |
| 5,255,733 | 10/1993 | King . | |
| 5,264,764 | 11/1993 | Kuang . | |
| 5,285,111 | 2/1994 | Sherman . | |
| 5,291,960 | 3/1994 | Brandenburg et al. . | |
| 5,301,764 | 4/1994 | Gardner . | |
| 5,318,142 | 6/1994 | Bates et al. . | |
| 5,327,987 | 7/1994 | Abdelmalek . | |
| 5,327,992 | 7/1994 | Boll . | |
| 5,337,848 | 8/1994 | Bader . | |
| 5,346,031 | 9/1994 | Gardner . | |
| 5,359,308 | 10/1994 | Sun et al. . | |

FOREIGN PATENT DOCUMENTS

| | | |
|---|---|---|
| 0136055 | 4/1985 | European Pat. Off. . |
| 0445873 | 9/1991 | European Pat. Off. . |
| 0510582 | 10/1992 | European Pat. Off. . |
| 0645271 | 3/1995 | European Pat. Off. . |
| 3230121 | 2/1984 | Germany . |
| 3335923 | 9/1994 | Germany . |

OTHER PUBLICATIONS

Masding et al., "A microprocessor controlled gear box for use in electric and hybrid–electric vehicles", Transactions of the Institute of Measurement and Control, vol. 10, No. 4, Jul. 1988–Sep. 1988, pp. 177–186.

*Primary Examiner*—Brian L. Johnson
*Assistant Examiner*—Michael Mar
*Attorney, Agent, or Firm*—Dilworth & Barrese

[57] ABSTRACT

A hybrid electric drive system for a vehicle having at least two drive wheels which receive torque from a primary drive shaft. The system includes an internal combustion engine which is operatively connected to a secondary drive shaft for delivering torque thereto, a transmission assembly for delivering torque to the primary drive shaft which has an input shaft that is operatively connected to the secondary drive shaft for receiving torque therefrom, and at least one electric motor which is operatively connected to the input shaft of the transmission assembly for delivering torque thereto.

8 Claims, 11 Drawing Sheets

DRIVE SYSTEM FOR HYBRID ELECTRIC VEHICLE

BACKGROUND OF THE INVENTION

1. Field of the Invention

The subject invention relates to a vehicle drive system, and more particularly, to a highly efficient drive system for a hybrid electric automobile which employs both a combustion engine and an electric motor to power the vehicle.

2. Description of the Related Art

For nearly a century, automobiles have been powered by internal combustion engines, which by the very nature of their fuel burning process, emit harmful waste products into the environment. Recently, vehicles that are powered solely by electric motors have been introduced in an attempt to minimize the amount of hazardous waste being admitted to the air. Electric vehicles are limited in their range and applicability however, since they possess large storage batteries that must be recharged over an extended period of time.

Automobiles utilizing both an internal combustion engine and an electric motor for power are also known in the art, and are commonly referred to as hybrid powered vehicles. These vehicles are designed to minimize harmful effluents and maximize the beneficial aspects of gas engines and electric motors. Early examples of hybrid electric vehicles are disclosed in U.S. Pat. No. 2,571,284 to P. T. Nims; U.S. Pat. No. 3,305,965 to R. Roth; and U.S. Patent No. 3,791,473 to Rosen. In general, there are two types of hybrid electric vehicle drive systems. A parallel drive system in which the internal combustion engine and the electric motor work in conjunction to power the drive wheels of the vehicle, and a series drive system wherein the internal combustion engine powers a generator for the electric motor and the electric motor delivers power to the drive wheels of the vehicle.

An example of a hybrid powered vehicle which employs a modified parallel drive system is disclosed in U.S. Pat. No. 4,042,056 to Horwinski. The modified drive system includes an internal combustion engine that delivers power to a front drive shaft of the vehicle and an electric motor that delivers power to a rear drive shaft of the vehicle through an automatic transmission. In operation, the electric motor and the automatic transmission are used to accelerate the vehicle to highway cruising speed. When or shortly before cruising speed is attained, the internal combustion engine is started and a magnetic clutch connects the engine to the front drive shaft. At the same time, the internal combustion engine can be employed to drive a generator that charges the batteries which deliver power to the electric motor.

Another hybrid electric vehicle which employs an internal combustion engine to drive the front wheels of the vehicle and an electric motor to drive the rear wheels of the vehicle, and which provides a mechanism for selecting between the two is disclosed in U.S. Pat. No. 4,351,045 to Fields et al. Other hybrid vehicle drive systems are disclosed in U.S. Pat. No. 3,732,751 to Berman et at.; U.S. Pat. No. 3,888,352 to Reinbeck; U.S. Pat. No. 4,423,794 to Beck; and U.S. Pat. No. 4,242,922 to Baudoin.

To date, there has not been a hybrid electric vehicle with a drive system delivering power to one set of drive wheels, that can operate in both a parallel configuration and a series configuration depending upon the driving conditions encountered by the driver. Such a system would promote the optimum utilization and distribution of energy in a hybrid electric vehicle, while maximizing efficiency and minimizing harmful pollutants.

SUMMARY OF THE INVENTION

The subject invention is directed to a highly efficient drive system for a hybrid electric vehicle having at least two drive wheels which receive torque from a primary drive shaft. The system comprises an internal combustion engine which is operatively connected to a secondary drive shaft for delivering torque thereto, a transmission assembly for delivering torque to the primary drive shaft and having an input shaft operatively connected to the secondary drive shaft for receiving torque therefrom, and at least one electric motor which is operatively connected to the input shaft of the transmission assembly for delivering torque thereto.

Means are operatively associated with the input shaft of the transmission assembly for disengaging the operative connection between the electric motor and the input shaft to facilitate the deliverance of torque to the input shaft solely from the internal combustion engine, and means are operatively associated with the secondary drive shaft for disengaging the operative connection between the internal combustion engine and the secondary drive shaft to facilitate the deliverance of torque to the input shaft of the transmission assembly solely from the electric motor.

The vehicle drive system also includes energy storage means for storing electric energy for deliverance to the electric motor, and a generator for generating electric energy for deliverance to the energy storage means. The generator is connected to an output shaft of the internal combustion engine, and means are preferably provided for selectively engaging the operative connection between the internal combustion engine and the generator.

The means for selectively engaging the operative connection between the internal combustion energy and the generator preferably comprises a solenoid clutch which is actuated when the electrical energy stored within the energy storage means falls below a predetermined minimum level. The means which are operatively associated with the input shaft of the transmission assembly preferably comprises an overrunning clutch assembly, as does the means which are operatively associated with the secondary drive shaft.

The drive system of the subject invention also includes means which are associated with the secondary drive shaft for transferring torque from the drive wheels to the generator when the transmission assembly is downshifted during braking. Preferably, the means for transferring torque comprises a solenoid clutch which is activated when a brake is applied to the drive wheels. Torque can also be transferred from the drive wheels to the generator during braking when the transmission is in gear, and the solenoid clutch is activated.

In a preferred embodiment of the subject invention, a pedal is provided for controlling vehicle acceleration. Preferably, the pedal is operatively connected to the internal combustion engine and the electric motor such that movement of the pedal between a neutral position and a predetermined depressed position causes the internal combustion engine to accelerate from idle to full throttle, and movement of the pedal through the predetermined position causes the electric motor to assist in acceleration. Additionally, a torque convertor assembly is operatively associated with an output shaft of the internal combustion engine and the secondary drive shaft to variably control the transmission of torque to the secondary drive shaft as the engine is accelerated from idle to full throttle.

The drive system of the subject invention further includes means for selectively switching between a first operating mode wherein power is directly transmitted from the internal combustion engine to the primary drive shaft, and a second operating mode wherein power from the internal combustion engine is directly transmitted to the generator and power from the electric motor is directly transmitted to the primary drive shaft. The later operating mode being extremely useful during stop and go city driving.

The subject invention is also directed to a hybrid electric drive system which includes an internal combustion engine having first and second output shafts, a dynamotor having an input shaft and an output shaft, at least one pulley-type torque convertor assembly having a driving pulley operatively connected to the first output shaft of the engine and a driven pulley operatively connected to the input shaft of the dynamotor, a transmission assembly operatively connected to the output shaft of the dynamotor for delivering torque to the drive shaft of the vehicle, a generator operatively connected to the second output shaft of the engine for generating electrical energy, and a solenoid clutch for selectively disengaging the operative connection between the driven pulley of the torque convertor and the dynamotor to facilitate operation of the vehicle in a parallel configuration and a series configuration.

These and other features of the vehicle drive system subject invention will become more readily apparent from the following detailed description of the invention taken in conjunction with the drawings.

BRIEF DESCRIPTION OF THE DRAWINGS

So that one skilled in the art to which the subject invention appertains will better understand how to make and use the invention, preferred embodiments thereof will be described hereinbelow with reference to the drawings wherein.

DETAILED DESCRIPTION OF THE PREFERRED EMBODIMENTS

Figure 1:
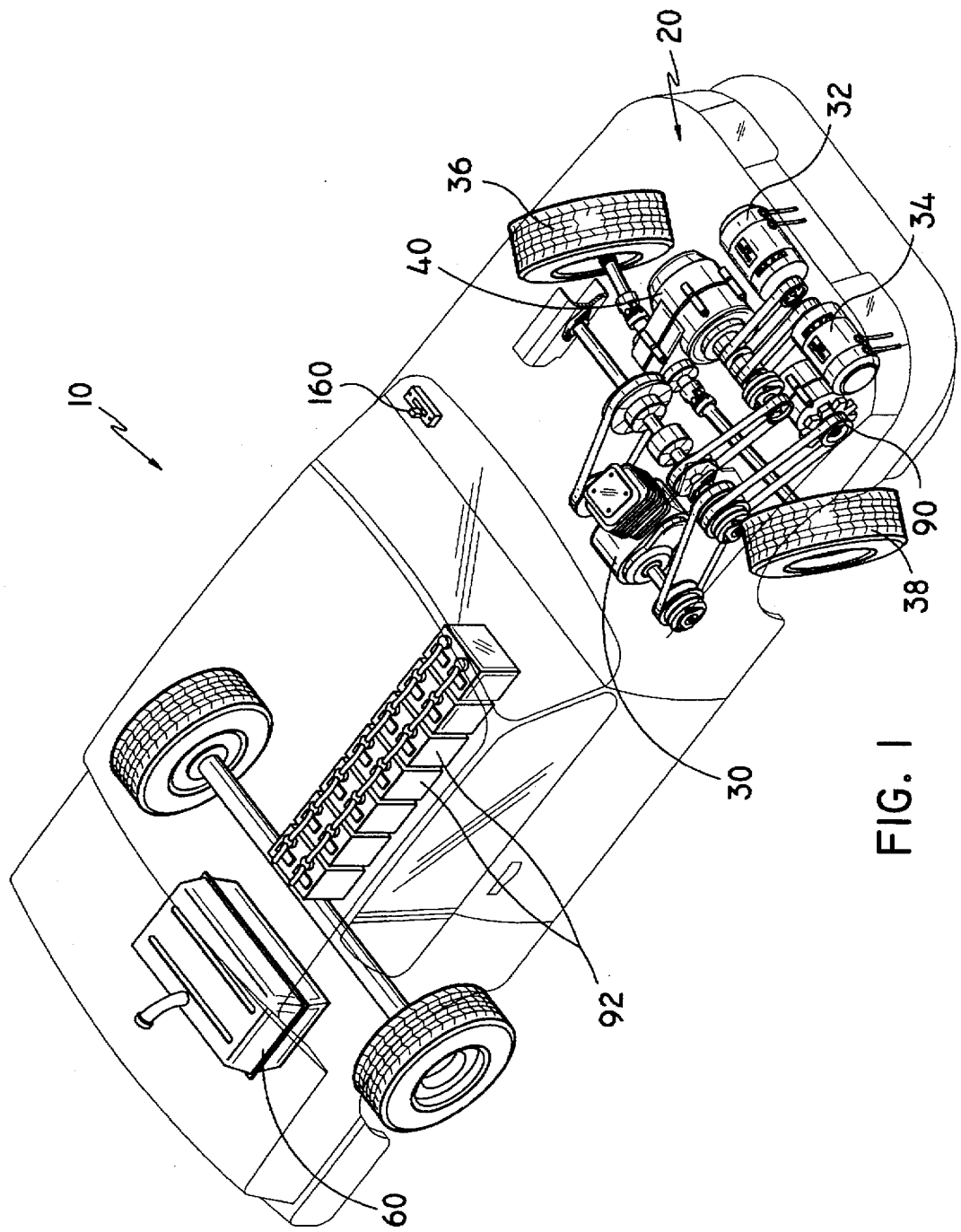
FIG. 1 is a perspective view of a hybrid electric vehicle which includes a vehicle drive system constructed in accordance with a preferred embodiment of the subject invention.

Referring now to the drawings wherein like reference numerals identify similar structural elements of the subject invention, there is illustrated in FIG. 1 a hybrid electric vehicle 10 having a drive system 20 constructed in accordance with a preferred embodiment of the subject invention. In brief, drive system 20 includes a relatively low horsepower internal combustion engine 30 (i.e., 20 hp) and two conventional electric motors 32 and 34 (i.e., 30–60 hp; DC motors) which deliver power to the drive wheels 36 and 38 of vehicle 10, either individually or concurrently, depending upon the operating conditions of the vehicle. The specific power of the engine and the motors will depend upon the size and weight of the vehicle.

Figure 2:
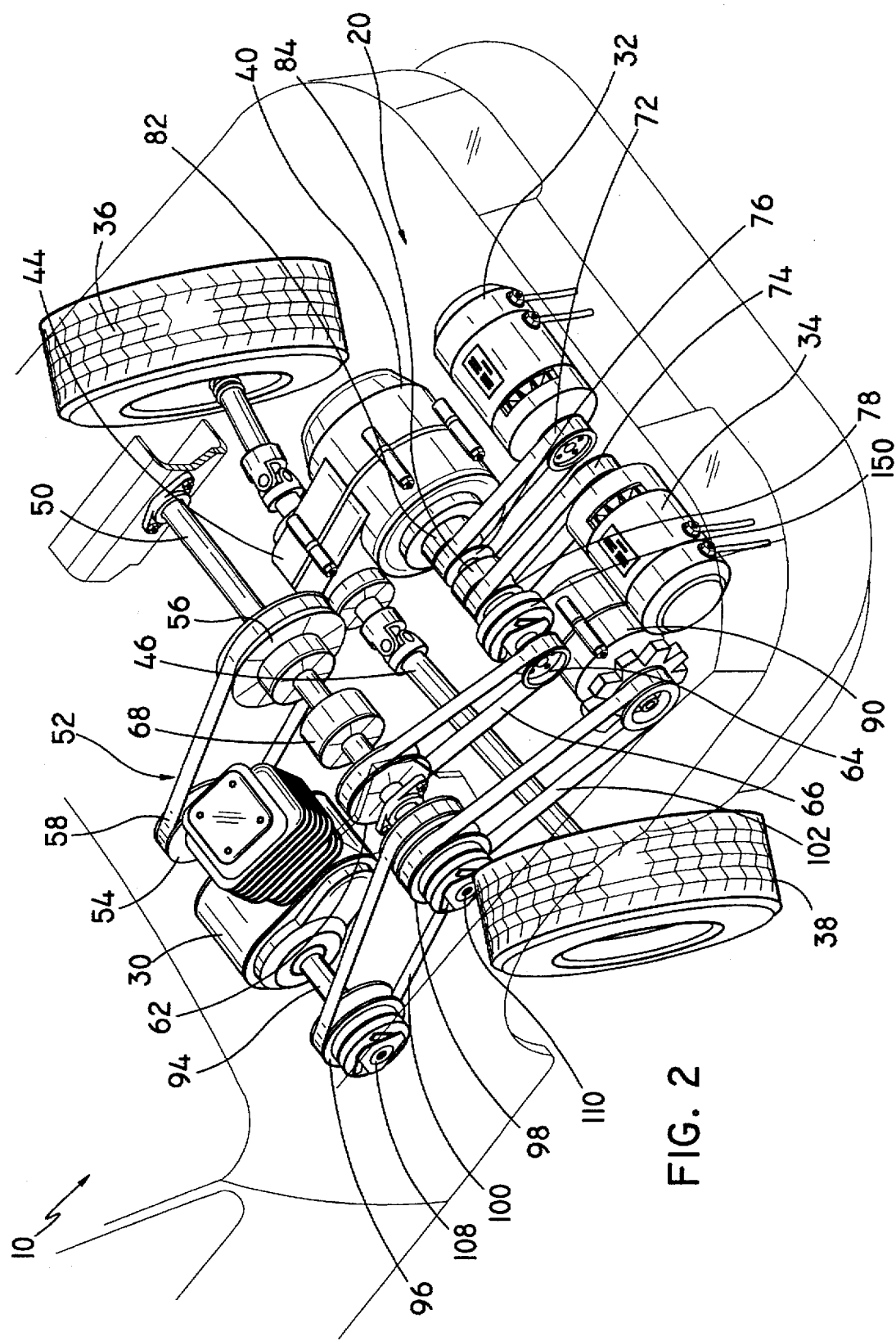
FIG. 2 is an enlarged perspective view of the engine compartment of the hybrid electric vehicle illustrated in FIG. 1 showing each of the components of the vehicle drive system of the subject invention.
Figure 3:
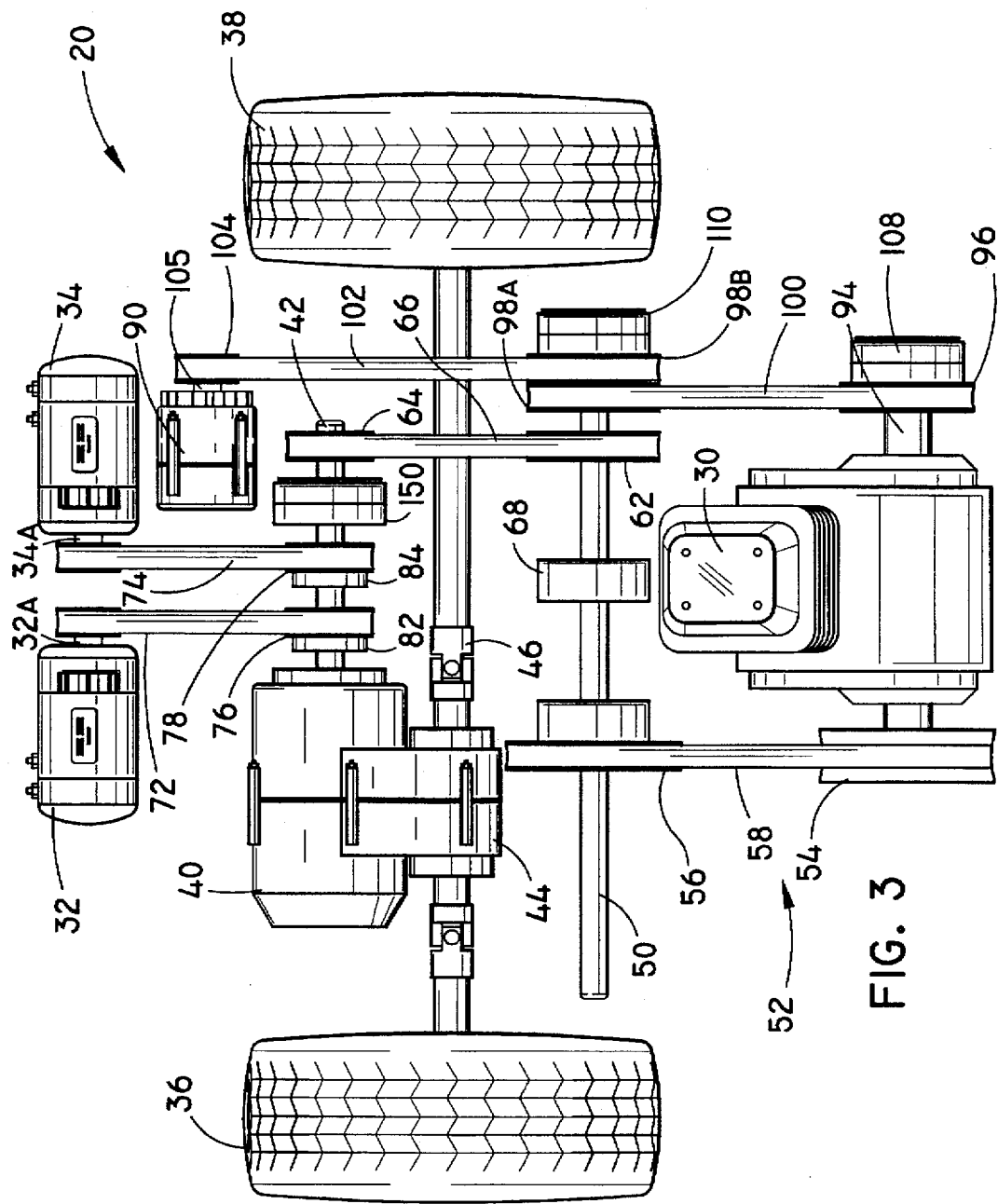
FIG. 3 is top plan view of the vehicle drive system of the subject invention in a steady state condition.

Referring to FIGS. 2 and 3, drive system 20 has a transmission assembly 40 having an input shaft 42 for receiving torque from engine 30 and motors 32 and 34, and a differential gear assembly 44 for transferring torque to the drive wheels 36 and 38 of vehicle 10 through primary drive shaft 46. Transmission assembly 40 is a multispeed transmission equipped with a number of forward speeds, neutral, and reverse. Other configurations are envisioned.

Engine 30 transfers torque to the input shaft 42 of transmission assembly 40 by way of a secondary drive shaft 50 mounted adjacent the primary drive shaft 46. More particularly, a pulley-type torque converter assembly 52 is associated with engine 30 for transmitting power to the secondary drive shaft 50. Torque converter assembly 52 includes a drive pulley 54 mounted to an output shaft of engine 30, a variable diameter driven pulley 56 mounted to secondary drive shaft 50, and a belt 58 operatively connecting the two. The torque converter assembly functions as a continuously variable transmission which gradually upshifts as the vehicle accelerates faster allowing the engine to operate at its optimum speeds without placing an undue load thereupon. The torque converter assembly enables vehicle 10 to accelerate from a stationary position to cruising speed using only the small internal combustion engine 30 powered by fuel stored in fuel tank 60 (see FIG. 1). As will be discussed in detail hereinbelow, at times when the engine is used solely to accelerate the vehicle to cruising speed, the electric motors 32 and 34 can be used for rapid acceleration or hill climbing.

With continued reference to FIGS. 2 and 3, a drive pulley 62 is mounted on secondary drive shaft 50 for transferring torque from drive shaft 50 to a second pulley 64 mounted at the end of the input shaft 42 of transmission assembly 40 by way of a belt 66. An overrunning clutch 68 is also mounted on the secondary drive shaft 50 between pulley 56 of torque converter 52 and drive pulley 62, for disengaging engine 30 from the input shaft 42 of transmission assembly 40. Overrunning clutches are well known in the art and employ the wedging action of a roller or sprag to automatically engage in one direction and free-wheel in the other direction. Thus, when clutch 68 is disengaged, engine 30 is isolated from the rest of the drive system, thereby reducing any parasitic drag on the system.

With continuing reference to FIGS. 2 and 3, the output shafts 32a and 34a of motors 32 and 34 are connected to the input shaft 42 of transmission assembly 40 by way of belts 72 and 74, respectively. More particularly, belts 72 and 74 deliver torque to respective pulleys 76 and 78 which are mounted side-by-side on the input shaft 42 of transmission assembly 40. Overrunning clutches 82 and 84 are operatively associated with pulleys 76 and 78, respectively, to engage input shaft 42 any time the pulleys 76 and 78 turn faster than input shaft 42. For example, when the vehicle is accelerating to cruising velocity under the power of engine 30 and the driver requires additional power to climb hills or quickly accelerate, the electric motors can be triggered by the driver to assist the gas engine in accelerating the vehicle for that period of time. The manner in which this is accomplished will be discussed in greater detail hereinbelow.

The drive system of the subject invention also includes a generator 90 (i.e., 15–22 kW) for generating electrical energy to power electric motors 32 and 34. Generator 90 is linked to a series of conventional lead-acid batteries 92 arranged along the central axis of the vehicle chassis, as shown in FIG. 1. Generator 90 is operatively connected to an output shaft 94 of engine 30 through a set of pulleys and clutches. In particular, a drive pulley 96 is mounted to an output shaft 94 for driving an intermediary double rim pulley 98 which is mounted on the secondary drive shaft 50. A first drive belt 100 extends from drive pulley 96 to the inner rim 98a of pulley 98 to transfer torque therebetween and a second drive belt 102 extends from the outer rim 98b of pulley 98 to a pulley 104 mounted on the input shaft 105 of generator 90 to transfer torque therebetween. Additionally, a first solenoid clutch 108 is operatively associated with drive pulley 96 for selectively engaging pulley 96 under certain operating conditions, and a second solenoid clutch 110 is operatively associated with double rim pulley 98 for engaging pulley 98 under other operating conditions to selectively control the connection of the engine 30 and generator 90.

Referring now to FIGS. 4–9, there is illustrated a series of schematic representations depicting the manner in which power is distributed throughout the drive system of the subject invention under various operating conditions. In the drawings, the directional arrows indicate the paths by which power is directed to and from the components of drive system 20, and in particular, to the two drive wheels 36 and 38 of the vehicle 10.

Figure 4:
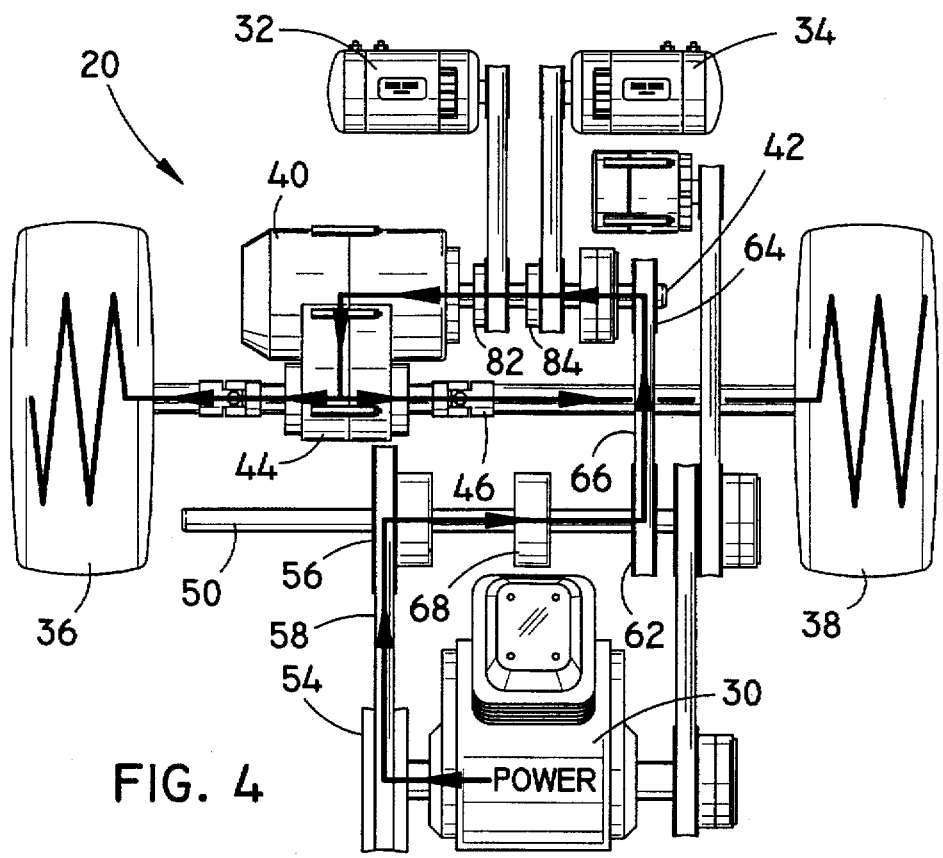
FIG. 4 is a schematic representation of the vehicle drive system of the subject invention illustrating the deliverance of power from the internal combustion engine to the primary drive shaft of the vehicle.

Turning to FIG. 4, as discussed hereinabove, under certain conditions, vehicle 10 may accelerate from a stationary position to a predetermined speed, utilizing only the power of internal combustion engine 30. Thus, as depicted by the directional arrows in FIG. 4, power from engine 30 is transferred from output shaft 35 to the secondary drive shaft 50 by way of the torque connector assembly 52, and then to the input shaft 42 of transmission assembly by pulley 62 and 64 and belt 66. At such a time, overrunning clutch 68 is engaged to secondary drive shaft 50, and the overrunning clutches 82 and 84 on input shaft 42 are disengaged, so that during acceleration, electric motors 32 and 34 present no parasitic drag to the system. However, as noted previously, when additional power is required to climb hills or rapidly accelerate (i.e. when merging onto a highway), the overrunning clutches 82 and 84 are engaged to enable the deliverance of power from motors 32 and 34 to the input shaft 42 of transmission assembly 40.

Figure 5:
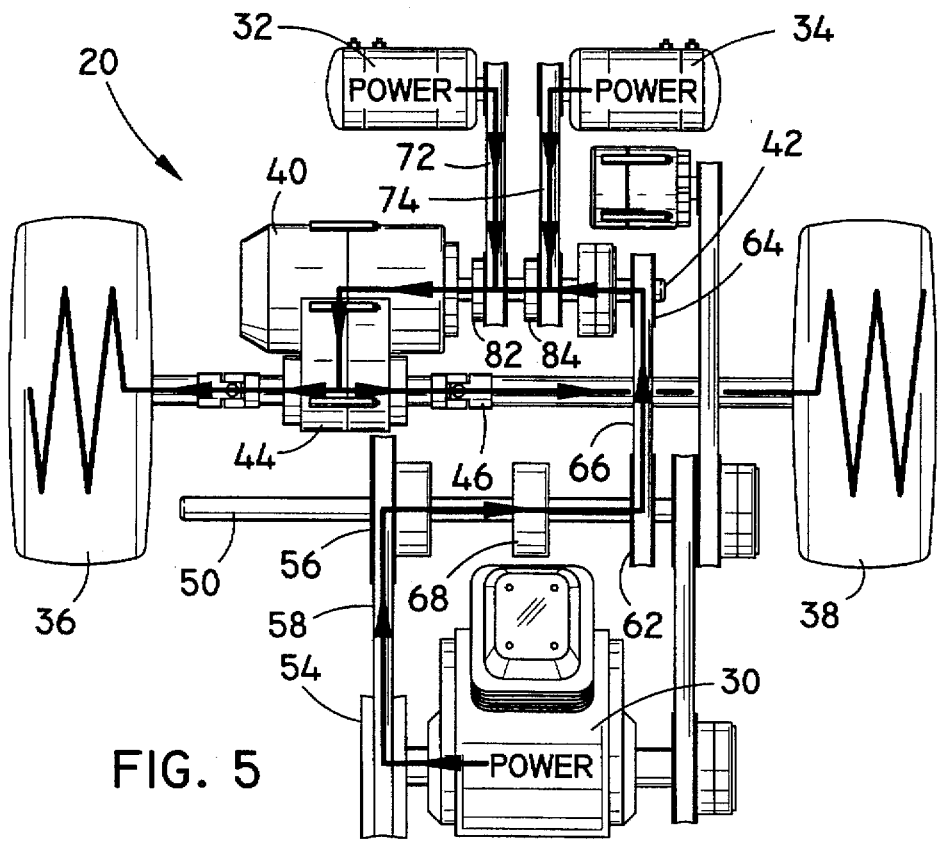
FIG. 5 is a schematic representation of the vehicle drive system of the subject invention illustrating the deliverance of power from the internal combustion engine of the electric motors to the primary drive shaft of the vehicle.
Figure 6:
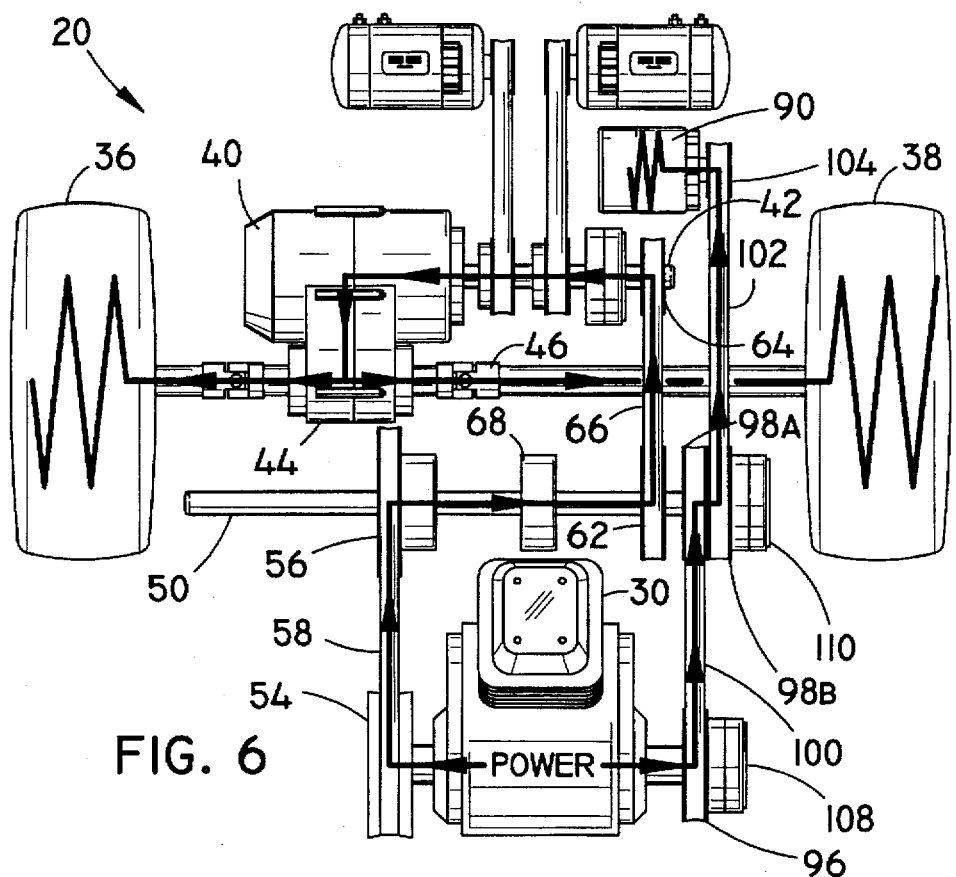
FIG. 6 is a schematic representation of the vehicle drive system of the subject invention illustrating the deliverance of power from the internal combustion engine to the primary drive shaft of the vehicle and the electric generator.
Figure 10:
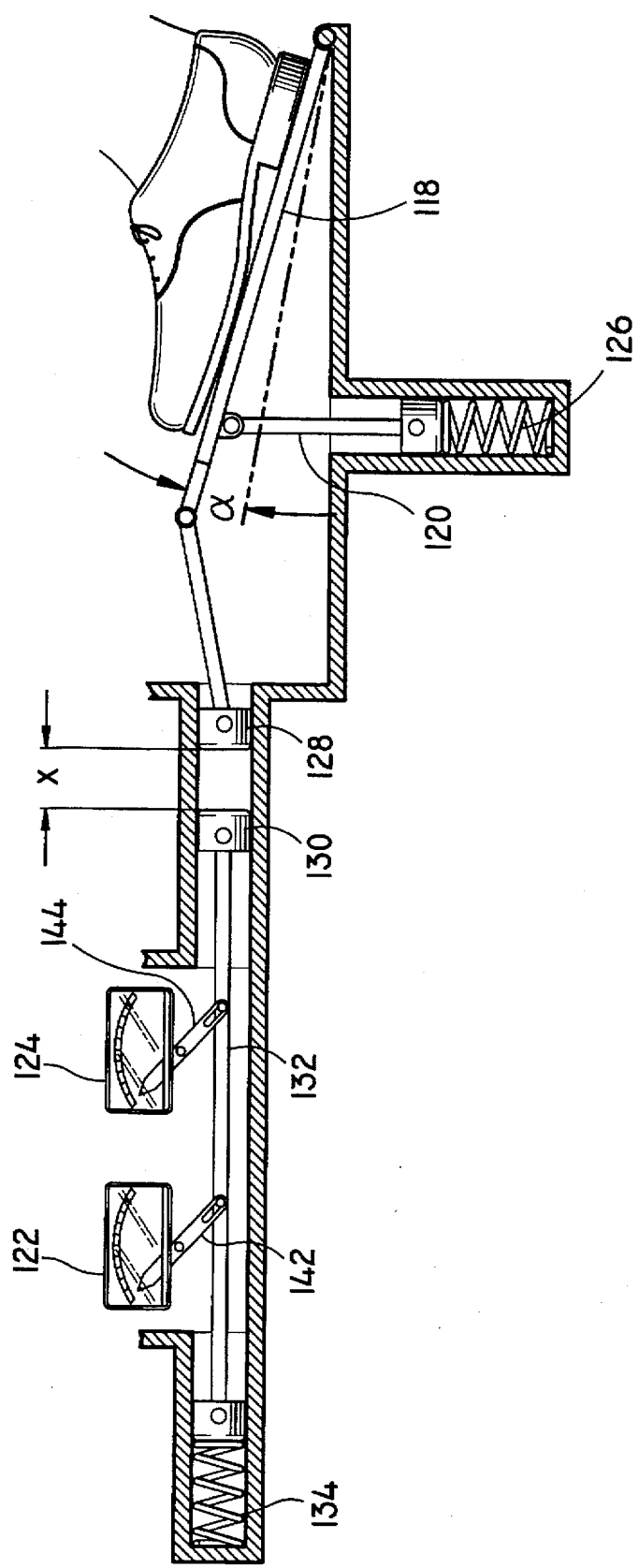
FIG. 10 is a schematic representation of a linkage assembly which connects the accelerator pedal of the vehicle to the combustion engine and the two electric motors of the drive system of the subject invention.

The engagement of overrunning clutches 82 and 84 is effectuated by movement of the accelerator pedal of vehicle 10. In particular, as illustrated in FIG. 10, the accelerator pedal 118 which controls the throttle 120 of engine 30 is also linked to two potentiometers 122 and 124 which are operatively connected to motors 32 and 34, respectively. In operation, when pedal 118 is depressed to normally accelerate vehicle 10 to cruising velocity it will do so by travelling through an angle "$\alpha$" which is approximately equal to ⅓ the total distance which pedal 118 can travel against the bias of throttle spring 126. During that time, slider 128 which is linked to pedal 118 translates through a linear distance "x" corresponding to the angular distance "$\alpha$". When pedal 118 is depressed further than the angle "$\alpha$", to achieve rapid acceleration for example, slider 128 will interact with, and drive adjacent slider 130. In doing so, slider link 132 will translate against the bias of spring 134, causing the parallel potentiometer links 142 and 144 to rotate, and thereby actuate electric motors 32 and 34, respectively. At such a time as illustrated in FIG. 5, vehicle 10 will be operating under the combined power of engine 30 and motors 32 and 34, and will have the same power as an automobile having a conventional internal combustion engine. When the added power is no longer required, and pedal 118 returns to its first third sector of motion, clutches 82 and 84 disengage from the input shaft 42, and the vehicle operates once again under the sole power of engine 30. Thereupon, the mean horsepower of engine 30 is used to maintain the vehicle at the cruising velocity, the remaining peak horsepower can be used for power generation.

Turning to FIG. 5, the drive system 20 of the subject invention is also configured so that engine 30 can charge generator 90 while vehicle 10 is operating under the sole power of the gas engine. During such operating conditions, solenoid clutch 108 is engaged and power is transmitted from the output shaft 94 of engine 30 to the input shaft 105 of generator 90 by way of drive belts 100 and 102. Through the use of a voltage regulator and selection of pulley ratios, the generator will draw only a small amount of power from the engine, leaving sufficient power to propel the vehicle. Solenoid clutch 108 is preferably controlled by a battery charge indicator and an engine speed sensor. Thus, when the batteries 92 are approximately 60% discharged and the engine is operating at a sufficient speed, clutch 108 will engage, permitting engine 30 to drive generator 90. When the batteries are approximately 20% discharged, or the engine is running too slow, clutch 108 disengages, eliminating the parasitic drag of the generator on the system. During this period of operation, solenoid clutch 110 is disengaged so that the double rim pulley 98 rotates independent of the rotation of the secondary drive shaft 50 which is receiving power from engine 30.

Figure 7:
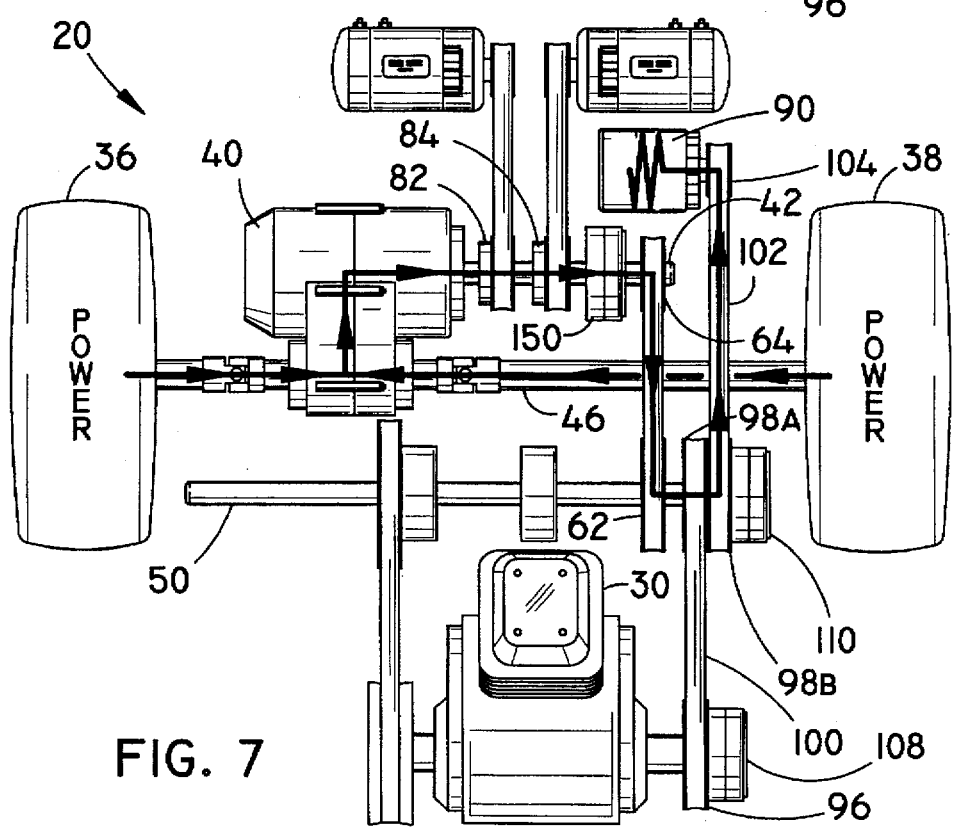
FIG. 7 is a schematic representation of the vehicle drive system of the subject invention illustrating the deliverance of power to the electric generator from the drive wheels of the vehicle.

Referring to FIG. 7, the drive system 20 of the subject invention also incorporates a regenerative braking subsystem wherein energy is transferred from the drive wheels of vehicle 10 to generator 90 as the transmission assembly is downshifted to slow the vehicle. In operation, when accelerator pedal 118 is released, solenoid clutch 108 disengages, allowing engine 30 to return to its idle speed. At such a time, overrunning clutch 68, which transmits torque in only one direction disengages, since the driven pulley 56 of torque converter 52 is turning slower then the drive pulley 62 on secondary drive shaft 50. Thereupon, vehicle 10 is free to coast without any parasitic drag from engine 30. Thereafter, when the brake pedal is depressed, solenoid clutch 110 engages, causing power to be transmitted from the front wheels to generator 90. During this time, torque is transferred from the input shaft 42 of the downshifting transmission assembly to generator 90 by way of drive belts 66 and 102.

Figure 8:
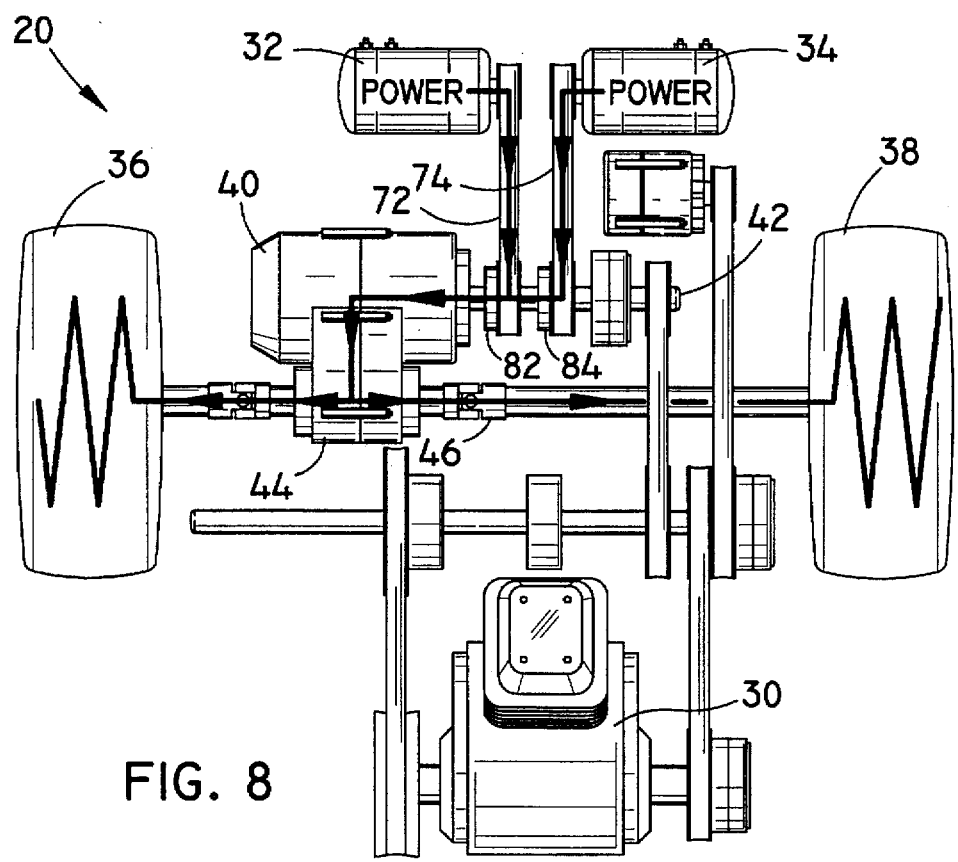
FIG. 8 is a schematic representation of the vehicle drive system of the subject invention illustrating the deliverance of power from the electric motors to the primary drive shaft of the vehicle.

Referring now to FIG. 8, the drive system of the subject invention is configured to operate in a zero emissions mode wherein power is transmitted to the drive wheels of vehicle 10 solely from electric motors 32 and 34. In this mode of operation, overrunning clutches 82 and 84 are engaged and power is transmitted from motor 32 and 34 to the input shaft 42 of transmission assembly 40 by way of belts 72 and 74, respectively. At such a time, a third solenoid clutch 150, which is mounted on the input shaft 42 of transmission assembly 40 is engaged and pulleys 62 and 64 are rotating so that power will be readily available to generator 90 if the brake pedal of the vehicle is applied. Additionally, overrunning clutch 68 is disengaged so that the engine 30 and torque converter 42 remain stationary. Solenoid clutches 108 and 110 are also disengaged at this time, so that all unnecessary parasitic drag is eliminated. Furthermore, since engine 30 is isolated from the rest of the system when the vehicle is operating in a zero emission mode, the first third of the travel of accelerator pedal 118 will produce no response. However, when the pedal is depressed further, the potentiometers which control the speed of motors 32 and 34 will be activated.

The zero emission mode of operation depicted in FIG. 8 can be selectively chosen by the driver by manipulating a selector switch 160 located on the dashboard of the vehicle (see FIG. 1). Thus, if the driver is taking a short trip, i.e., 25 miles or less, and is travelling within a city environment having strict pollution controls, the zero emission mode can be easily selected. This mode may be less advantageous for longer trips due to the storage capacity of the batteries.

Figure 9:
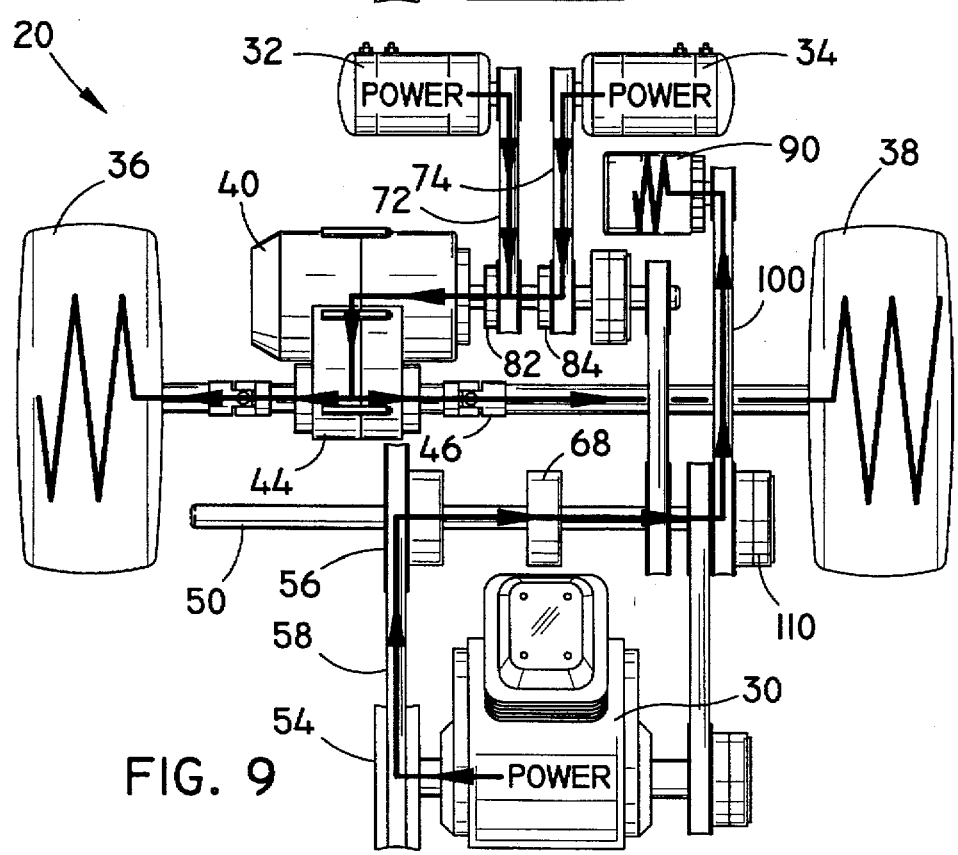
FIG. 9 is a schematic representation of the vehicle drive system of the subject invention illustrating the deliverance of power from the electric motors to the primary drive shaft of the vehicle and from the internal combustion engine to the electric generator.

Referring to FIG. 9, there is illustrated a schematic representation of the manner in which power is distributed within the drive system 20 of the subject invention when the system is switched from a parallel operating mode to a series operating mode. In a parallel mode of operation, mechanical energy from engine 30 is transmitted directly to the drive wheels together with energy from the electric motors. In a series mode of operation, which is more efficient in stop-and-go traffic than a parallel configuration, power is delivered to the drive wheels only by the electric motors, and the engine is employed to deliver power to the generator.

Figure 11:
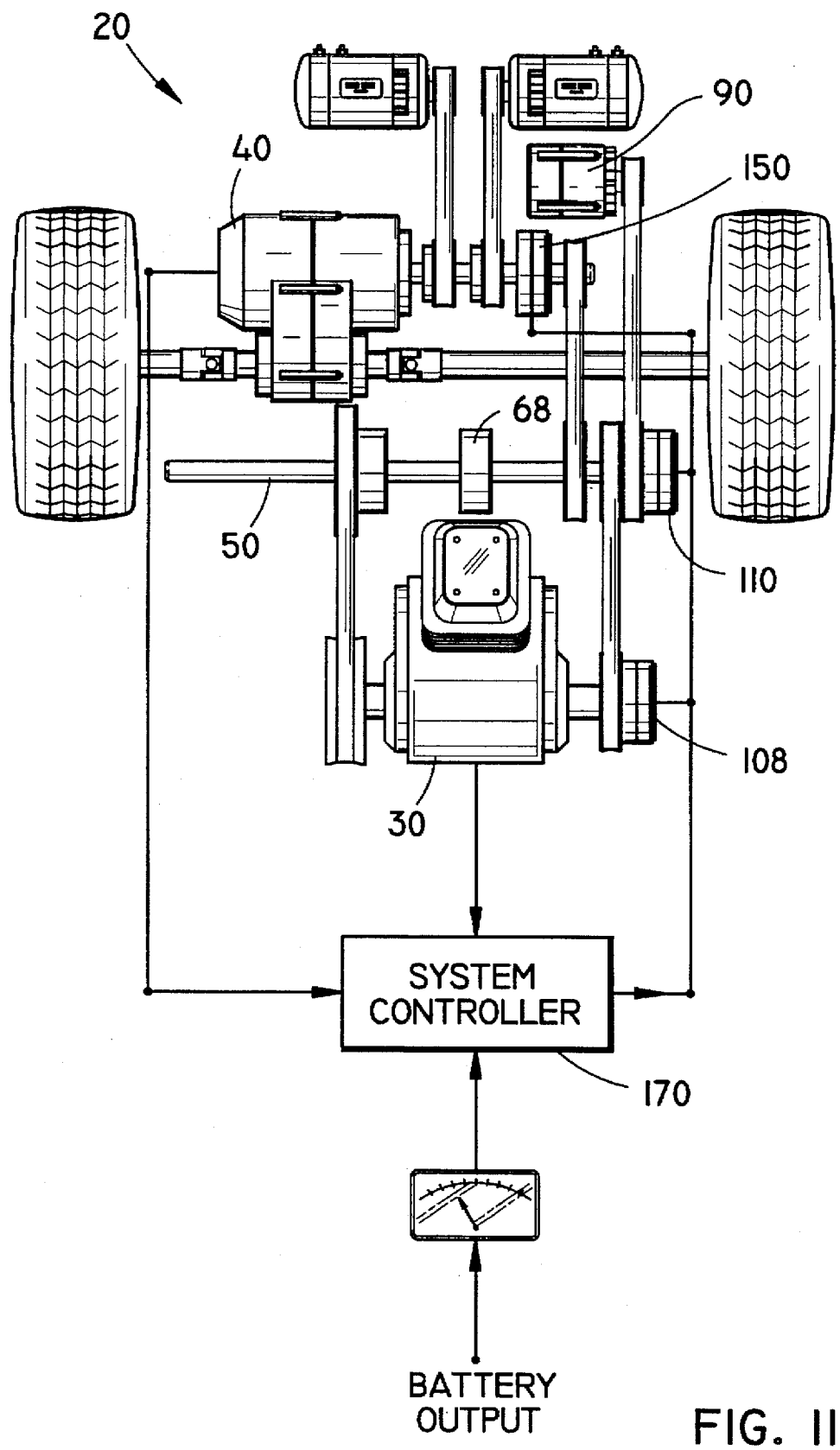
FIG. 11 is a schematic representation of a system controller which controls the various operating modes of the drive system of the subject invention.

As illustrated schematically in FIG. 11, the drive system of the subject invention utilizes a computerized controller 170 to switch between the series and parallel modes of operation. The system controller monitors all of the control parameters of the drive system including, for example, battery state of charge and vehicle speed, and is electrically connected to each of the interactive components of the drive system. Under conditions which are favorable to the series operating mode, the system controller disengages solenoid clutch 150 and engages solenoid clutch 110 so that all of the mechanical energy of engine 30 is transmitted to generator 90 by way of the secondary shaft 50. Since the torque converter is in operation at this time, power generation increases and decreases in proportion to engine speed. In this mode of operation, it is also possible to temporarily engage clutch 150 to send power to the generator from the drive wheels during the regenerative braking periods. At such times, overrunning clutch 68 allows engine 30 to slow to idle speed, thus conserving the energy consumed thereby.

Referring now to FIGS. 12–17, there is illustrated another embodiment of a vehicle drive system constructed in accordance with a preferred embodiment of the subject invention and designated generally by reference numeral 200. Drive system 200 accomplishes the same results as the drive system discussed hereinabove, but does so utilizing substantially fewer mechanical components. In particular, the two prime movers of vehicle drive system 200 are an internal combustion engine 210 and a 60–120 hp dynamotor 220 which has the combined capabilities of an electric motor and an electric generator.

Drive system 200 further includes a pulley-type torque convertor assembly 230 which connects one of the output shafts of engine 210 to the input shaft of dynamotor 220 and includes an input pulley 232 and an output pulley 234 connected by a drive belt 236. The torque convertor functions as a continuously variable transmission which gradually upshifts as the vehicle accelerates. A generator 240 is connected to the other output shaft of engine 210 for generating electrical energy to charge the vehicle batteries. Dynamotor 220, which utilizes energy stored in the batteries during certain operating conditions, is connected to the vehicle transmission 250. A differential 270 connects transmission 250 to drive shaft 260.

A solenoid clutch 280 is operatively associated with the output pulley 234 of torque convertor 230 to facilitate selective switching between a parallel drive configuration wherein both dynamotor 220 and internal combustion engine 210 power drive shaft 260, and a series drive configuration wherein dynamotor 220 powers drive shaft 260 and internal combustion engine 210 power generator 240. An overrunning clutch 290 is operatively associated with output pulley 234 for selectively disengaging the torque convertor from transmission assembly 250 to isolate combustion engine 210 when it is not being employed as a prime mover.

Figure 12:
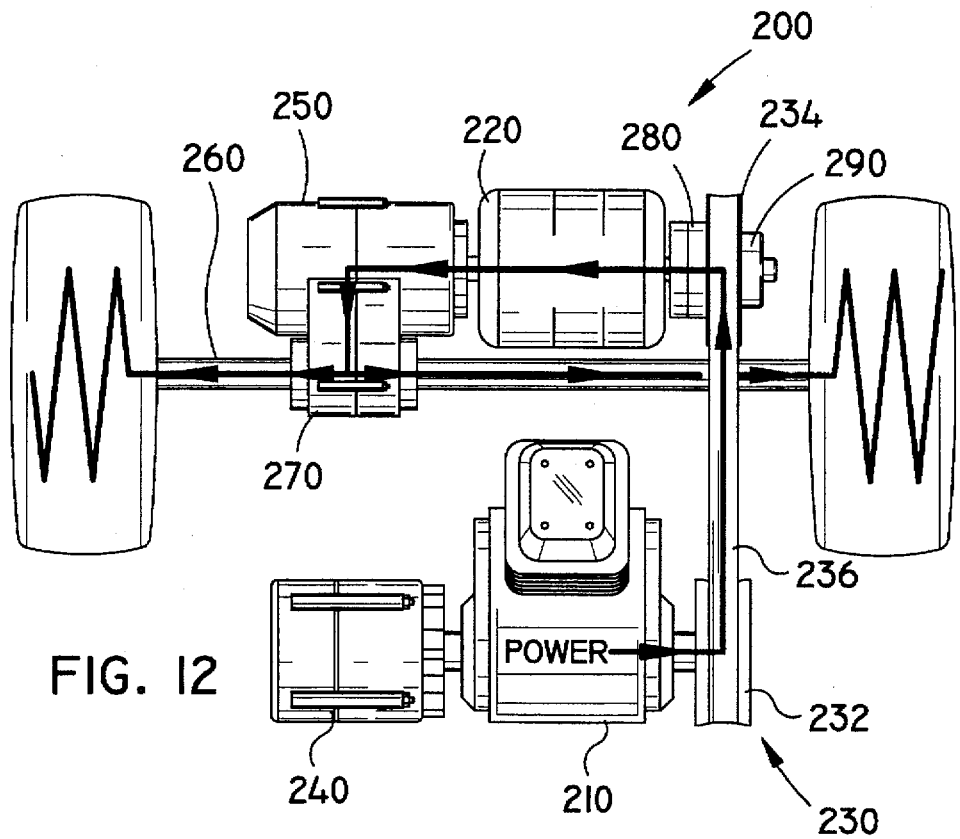
FIG. 12 is a schematic representation of an alternative embodiment of the vehicle drive system of the subject invention illustrating the deliverance of power from the combustion engine to the primary drive shaft of the vehicle.
Figure 13:
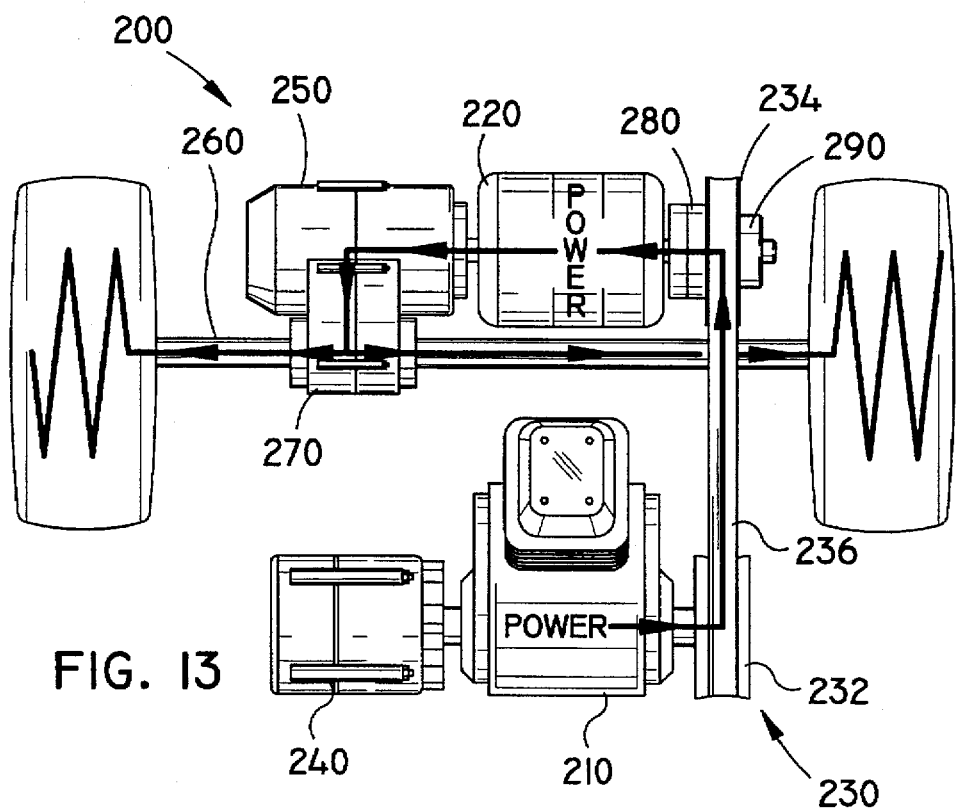
FIG. 13 is a schematic representation of the alternative vehicle drive system illustrating the deliverance of power from the combustion engine and the dynamotor to the primary drive shaft of the vehicle.

Referring to FIG. 12, when the vehicle employing drive system 200 is slowly accelerating or traveling at a predetermined cruising speed, internal combustion engine 210 functions as the prime mover for the vehicle, delivering power to transmission assembly 250 by way of torque convertor assembly 230. At such a time, overrunning clutch 290 is engaged and dynamotor 220 functions as a mechanical coupling, transmitting torque to the transmission assembly. When rapid acceleration is required, combustion engine 210 and dynamotor 220 are employed in conjunction with one another to deliver power to the drive wheels of the vehicle as illustrated in FIG. 13. At such a time, solenoid clutch 290 and overrunning clutch 280 are both engaged.

Figure 14:
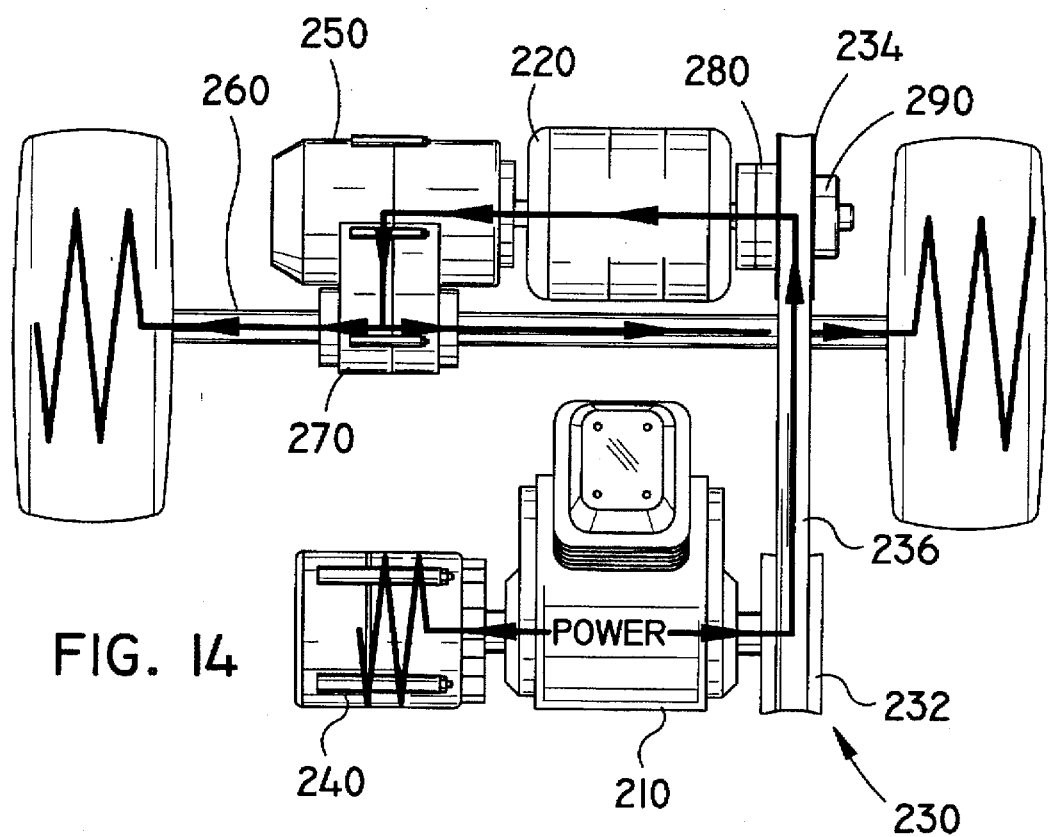
FIG. 14 is a schematic representation of the alternative vehicle drive system illustrating the deliverance of power from the combustion engine to the drive wheels of the vehicle and the generator to charge the batteries while cruising.

During cruising mode, when combustion engine 210 is functioning as the sole prime mover of the vehicle employing drive system 200, the mean horsepower of engine 210 is utilized to power the vehicle and the remaining horsepower is transferred to generator 240 for charging the vehicle batteries, as illustrated in FIG. 14. As in the previous embodiment, power generation is dependent upon battery charge and can be controlled electronically by means of sensors associated with a vehicle control system.

Figure 15:
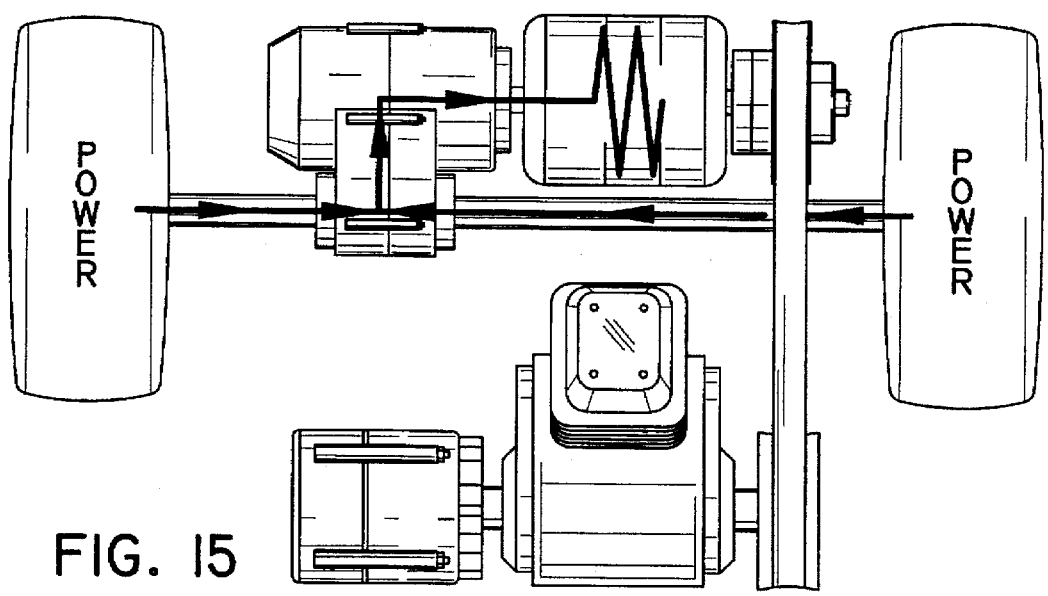
FIG. 15 is a schematic representation of the alternative vehicle drive system illustrating the deliverance of power from the drive wheels of the vehicle to the dynamotor during regenerative braking.

Referring to FIG. 15, as in the previous embodiment, vehicle drive system 200 is configured to employ regenerative braking to reclaim lost energy. During regenerative braking, when the vehicle is downshifted or the brakes are applied, power is transferred from the drive wheels, through drive shaft 260 and transmission assembly 250, to dynamotor 220, which under such conditions, functions as a generator to produce electrical energy to charge the batteries. In this mode of operation, overrunning clutch 290 is disengaged, isolating the combustion engine 210 from the rest of the drive system. Solenoid clutch 280 remains engaged to provide quick engine response when power is again required.

Figure 16:
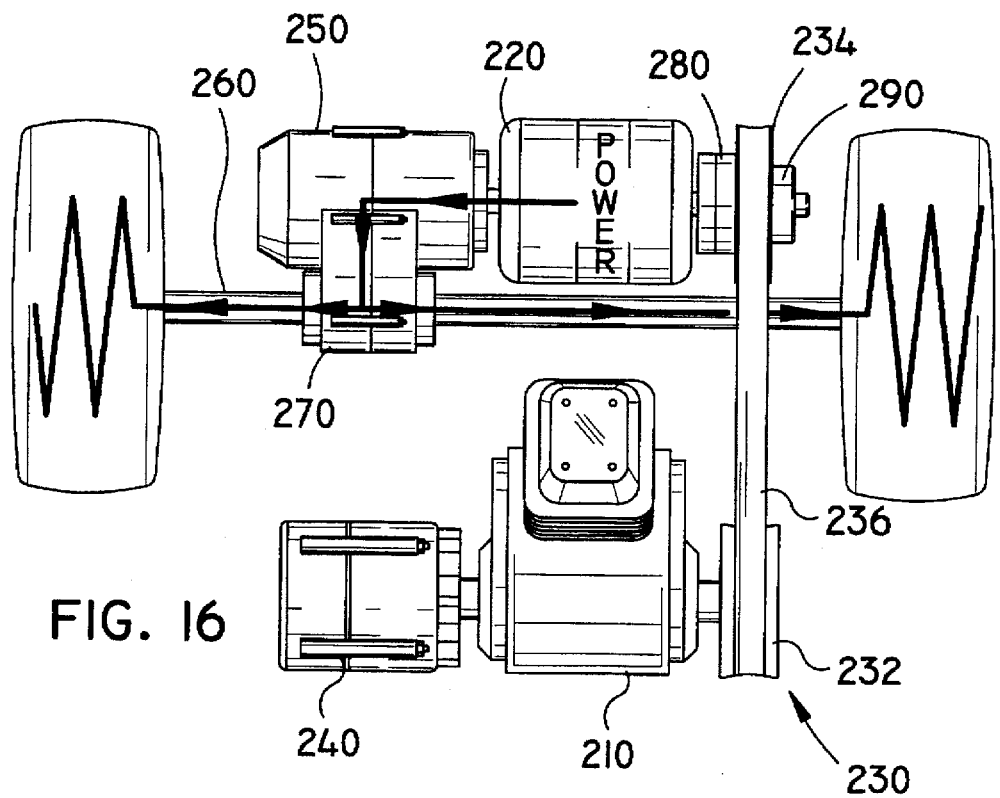
FIG. 16 is a schematic representation of the alternative vehicle drive system illustrating the deliverance of power from the dynamotor to the drive wheels while operating in a zero emissions mode.
Figure 17:
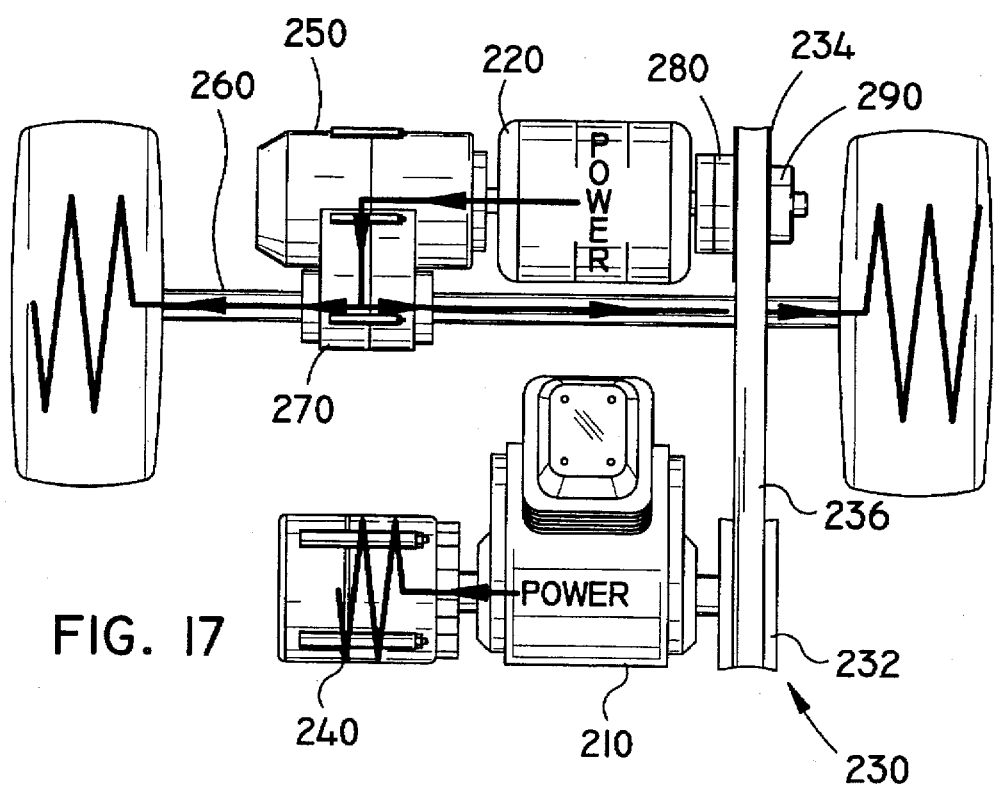
FIG. 17 is a schematic representation of the alternative vehicle drive system illustrating the distribution of power when the system is switched from a parrel to a series configuration.

Referring to FIG. 16, when vehicle drive system 200 is operable in a zero emissions mode, dynamotor 220 is employed as the prime mover. In this instance, overrunning clutch 290 is disengaged and solenoid clutch 280 is preferably engaged. As in the previous embodiment of the subject invention, vehicle drive system 200 is operable in both a parallel configuration and a series configuration. In a parallel configuration, power is transferable from internal combustion engine 210 and dynamotor 220 to the drive wheels of the vehicle. In a series configuration power from dynamotors 220 is transferable to the drive wheels, and combustion engine 210 powers generator 240. To switch from a parallel mode of operation, such as those illustrated in FIGS. 11–13, to a series mode of operation which is illustrated in FIG. 17, overrunning clutch 290 is switched from a normally engaged position wherein the driven pulley 234 of torque convertor 230 is engaged, to a disengaged position wherein the driven pulley is disengaged to isolate the torque convertor. Switching may be accomplished manually or by way of an electronic control system.

Although the subject invention has been described with respect to preferred embodiments, it will be readily apparent to those having ordinary skill in the art to which it appertains that changes and modifications may be made thereto without departing from the spirit or scope of the subject invention as defined by the appended claims. For example, with the exception of the torque convertor, the belts and pulleys can be replaced by a gear box having input and output shafts for the engine, generator, and electric motors. Additionally, the electric and gas engine throttles can be operated by computer controlled actuators instead of the mechanical system described in FIG. 10. This would allow a computer to automatically adjust the duty cycles of the internal combustion engine and electric motors to reach any desired depth of battery discharge after a specified number of miles.

What is claimed is:

1. A hybrid electric drive system for a vehicle having at least two drive wheels, the system comprising:
   a) an internal combustion engine having a first output shaft and a second output shaft;
   b) a first transmission assembly having an input shaft and an output shaft, the output shaft being operatively connected to a drive shaft, the drive shaft being connected to the drive wheels;
   c) a second transmission assembly having an input and an output, the input being connected to the first output shaft of the internal combustion engine, the second transmission assembly being a continuously variable transmission;
   d) a dynamotor operatively connected between the input shaft of the first transmission and the output of the second transmission;
   e) a first clutch for selectively connecting the output of the second transmission to an input shaft of the dynamotor; and
   f) a generator connected to the second output shaft of the internal combustion engine.

2. A hybrid electric drive system according to claim 1, wherein the first clutch is a solenoid clutch.

3. A hybrid electric drive system according to claim 1, wherein the second transmission is a pulley-type torque converter having an input pulley and an output pulley.

4. A hybrid electric drive system according to claim 3, further comprising a second clutch operatively associated with the output pulley.

5. A hybrid electric drive system according to claim 4, wherein the second clutch is an overrunning clutch.

6. A hybrid electric drive system according to claim 1, further comprising energy storage means for storing electric energy generated by the generator.

7. A hybrid electric drive system according to claim 6, wherein the energy storage means comprises a plurality of batteries.

8. A hybrid electric drive system according to claim 1, further comprising a differential gear assembly interconnecting the first transmission assembly and the drive shaft.

* * * * *